United States Patent [19]

Schneider

[11] Patent Number: 4,489,791

[45] Date of Patent: Dec. 25, 1984

[54] WRAP AROUND TOOL BAR STRUCTURE

[76] Inventor: Arthur C. Schneider, 936 E. Maple Ave., Mora, Minn. 55051

[21] Appl. No.: 394,829

[22] Filed: Jul. 2, 1982

[51] Int. Cl.³ .......................................... A01B 63/102
[52] U.S. Cl. ................................. 172/776; 130/30 P;
172/451; 172/817; 280/760
[58] Field of Search ............... 172/300, 306, 308, 451,
172/810, 817, 19, 20, 33, 829, 830, 776, 680;
130/30 P; 171/17, 18, 19, 20; 280/760, 769

[56] References Cited

U.S. PATENT DOCUMENTS

| | | | |
|---|---|---|---|
| 2,215,516 | 9/1940 | Schooler | 171/17 |
| 2,468,639 | 4/1949 | Sample | 171/18 |
| 2,562,338 | 7/1951 | Snyder | 209/705 |
| 2,622,500 | 12/1952 | Hugger | 172/810 |
| 2,626,550 | 1/1953 | Derror et al. | 172/300 X |
| 2,745,330 | 5/1956 | Nelson | 172/451 X |
| 2,752,837 | 7/1956 | Parker | 172/300 X |
| 3,001,590 | 9/1961 | Tsuchiya | 172/451 |
| 3,260,003 | 7/1966 | Rolfe | 172/817 X |
| 3,670,824 | 6/1972 | Buchanan | 172/451 X |
| 4,019,755 | 4/1977 | Eisenhardt | 172/451 X |

FOREIGN PATENT DOCUMENTS 221320 4/1959 Australia .............................. 172/817

Primary Examiner—Richard T. Stouffer

[57] ABSTRACT

This invention is a simple, relatively inexpensive tool bar structure featuring a rigid rectangular frame work pivotally mounted on the rear axle of a tractor. When the tractor is equipped with a hydraulic lift system, and said hydraulic lift system is flexibly linked with the invention, a tilting rigid tool bar structure is provided thereby. This tool bar structure will allow many implements that are adapted to commonly used 2 and 3 point hydraulic lift systems to be used on any and all sides of the invention if so desired.

An unusually heavy implement's weight may be counter balanced over the pivotal mounting of invention by counter weights or with other elements of their construction that can be placed forwardly to relieve the overload of tractor's hydraulic lift system. The lateral stability of the tool bar is also greatly improved with the anchoring of tool bar structure on the tractor's rear axle shaft.

4 Claims, 11 Drawing Figures

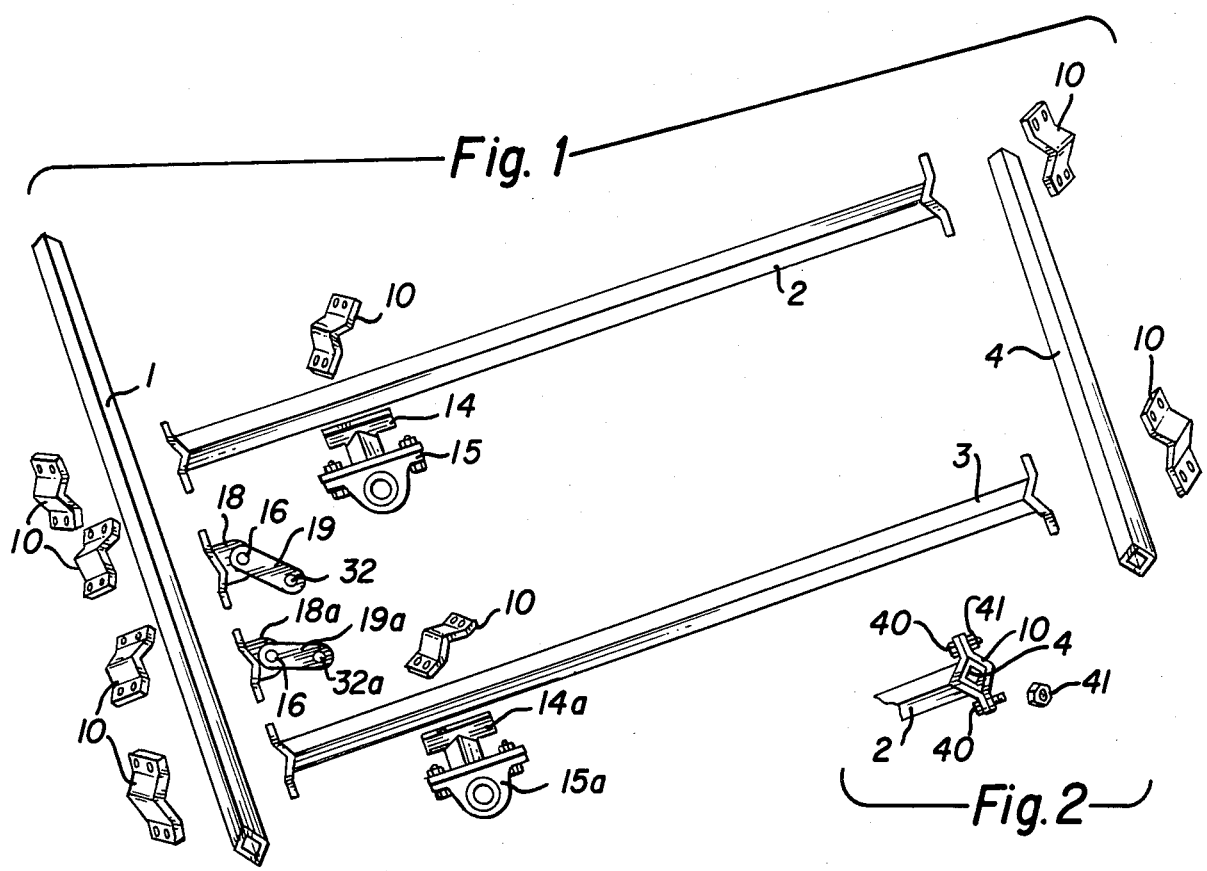
Fig. 1
Fig. 2
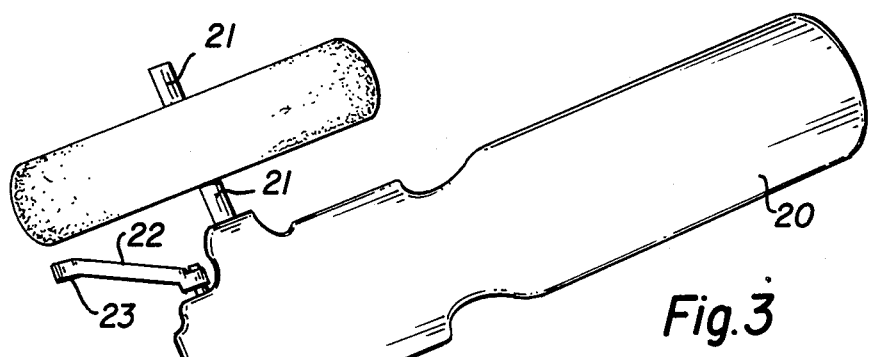
Fig. 3
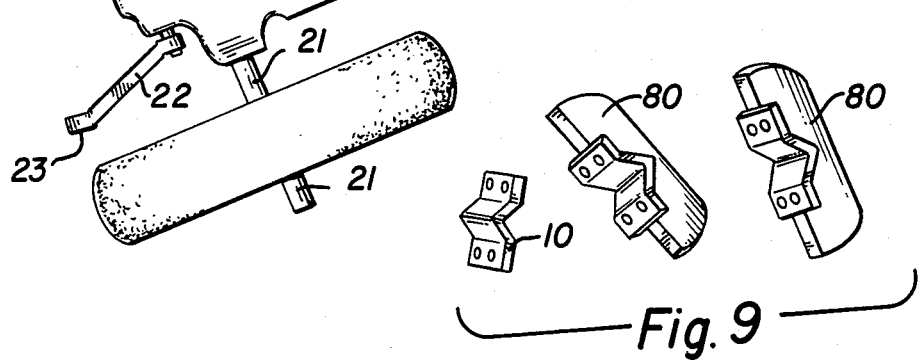
Fig. 9

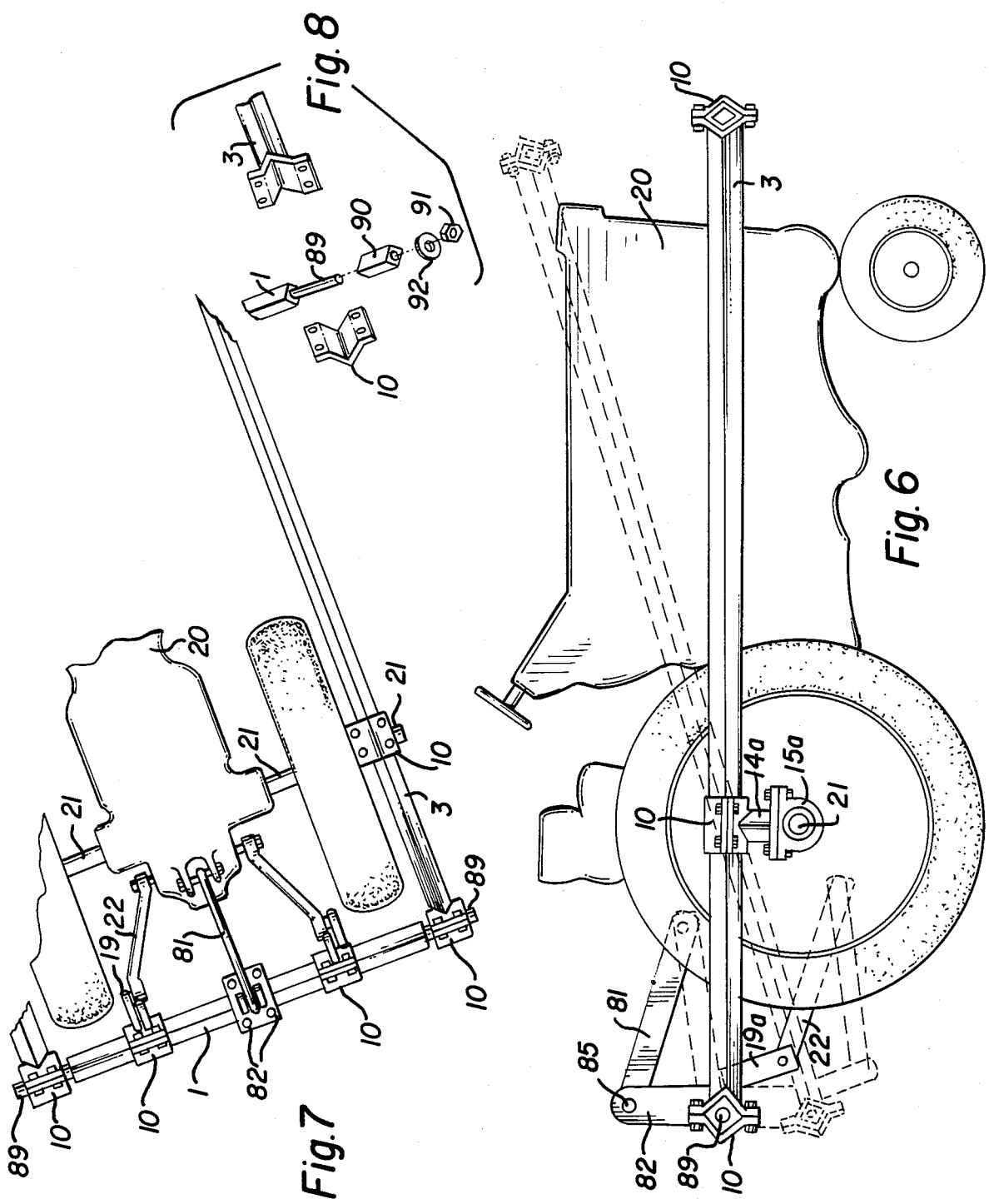

WRAP AROUND TOOL BAR STRUCTURE

This invention relates to an improvement of commonly used means of attaching various tool bar mounted agricultural and construction implements to prime movers such as farm type and track laying tractors.

Heretofor said tool bar mounted implements were attached to tractors by hydraulically activated lift arms. said lift arms also served as draw bar means for said implements.

These devices work well for moderately heavy implements up to the weight supporting capacity of the tractors hydraulic system, but heavier implements must be assisted by auxiliary lift devices. An example of said auxiliary lift device would be commonly used hydraulically supported tranversely hinged trailing caster wheels.

The purpose of this invention is to provide a easily constructed structure to eleminate the necessity for having to use said auxiliary lift devices on the heavier implements mentioned above.

With this thought in mind this invention contemplates a rectangular shaped frame designed to be pivotally mounted on a tractor's rear axle shaft outside the rear wheels attached thereto, thereby encompassing said tractor. Said rectangular frame consists of at least one member adapted to be a tool bar and is attached to said tractor's hydraulicaly activated two point hitch system's lift arms with a flexible linkage. Thereby the invention will allow an implement attached to said tool bar to be raised or lowered by said flexible linkage used in combination with aforsaid pivotal mounting on tractor's rear axleshaft outside the rear wheels attached thereto. This provides a much more stable tool bar structure to which implements adapted to standard square tool bar may be quickly and easily attached with clamps.

The object of this invention is, therefore, to provide a tool bar structure permitting an attached implement's weight to be counter balanced over said pivotal mounting on axleshaft outside the rear wheels by distributing elements of said implement fore and aft of said pivotal mounting.

Another object of this invention is to provide a means to counter balance a rear attached implement by a counter weight mounted on forward portion of invention. This counter balancing of a mounted implement will keep the front wheels of tractor firmly on ground besides relieving undue overload of tractor hydraulic system.

Another object of the invention is to provide mounting means for elements of mounted implements on four sides of the encompassed tractor. This feature, thereby, simplifies the construction of various harvester implements by eleminating the need of many otherwise necessary elements.

A still another object of the invention is to provide means to relieve undue stress on tractor rear axleshaft bearing housings incorporated into said tractor, by the invention's pivotal mounting on said tractor axle shaft.

A further object of the invention is to provide a tool bar in front of the tractor to attach implements such as, a snow plow, a push blade, a scoop, etc. which can be attached by conventional tool bar clamps, and to utilize the tractors hydraulic lift system for their operation.

Other features and advantages of the invention will appear from the following description taken in connection with the drawings, wherein;

FIG. 1 is a exploded view of the invention;

FIG. 2 is a side elevational view of the connecting device used to assemble elements of the invention;

FIG. 3 is a top view of a commonly used farm tractor with parts shown which are used in conjunction with the invention;

FIG. 6 is a side elevational view of the invention modified to accept the third arm of a 3 point hitch catagory with raised position shown in solid lines and lowered position in dotted lines;

FIG. 7 is a upper plan view of modified invention of FIG. 6 showing placement of third arm linkage of 3 point catagory hitch;

FIG. 8 is a exploded view of extremities of tool bar pivotally incorporated into modified invention shown in FIG. 6;

FIG. 9 is a view of counter weights to be mounted on forward tool bar 4 if necessary

Figure 4:
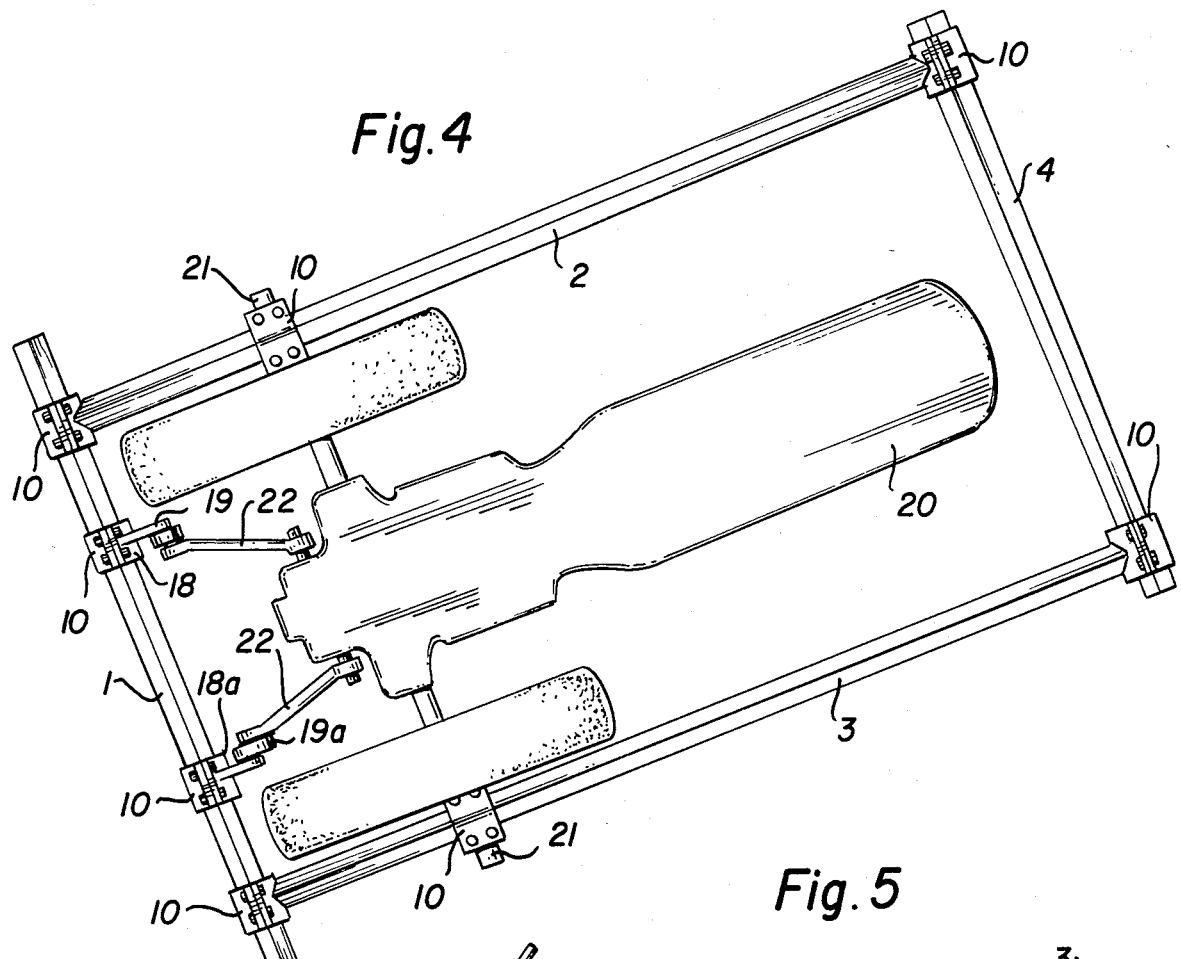
FIG. 4 is a plan view of said farm tractor with the invention attached.

Referring now to the drawing, and more particularly to FIG. 1, and FIG. 2, thereof, of the invention indicated in its entirety by the reference character A, including a rear tool bar member 1, and a front tool bar member 4. Both tool bar members 1 and 4 being squared tubes positioned with their sides in a 45 degree angle from perpendicular mode, are attached to and supported by longitudinal members 2 and 3, as is shown in FIG. 2, and secured theron with caps 10, bolts 40, and nuts 41. Positioning longitudinal members 2 and 3 with their sides in a 45 degree angle from perpendicular mode allows the members 2 and 3 to also be used as tool bars, to which implements, or elements there of, can easily be attached with clamping devices commonly incorporated in said implements. This combination of members 1, 2, 3, and 4 now forms the rigid rectangular framework of the invention.

Risers 14 and 14a with bearings 15 and 15a are attached to side bar members 2 and 3 with clamp cups incorporated in said risers 14 and 14a, and being secured as shown in FIG. 2 by caps 10, bolts 40, and nuts 41. When tractor axle shaft 21 is journaled into bearing 15 and 15a of the risers 14 and 14a, the rectangular framework of invention is pivotally mounted on the tractor outside the rear wheels thereof.

Figure 5:
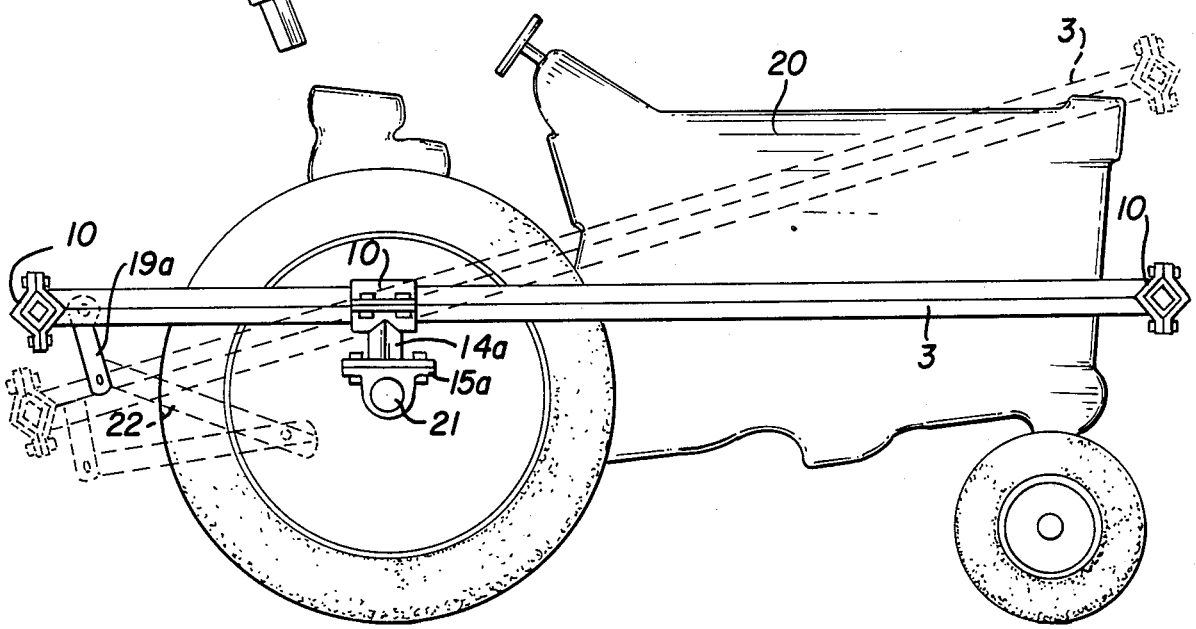
FIG. 5 is a side elevational view of the invention attached to said farm tractor with the invention shown as in a raised position in solid lines and as in a lowered position in dotted lines.

Tool bar 1 now receives the clamps 18 and 18a positioned substancially equidistant between bar members 2 and 3, and secured tool bar 1 by caps 10, bolts 40, and nuts 41 as shown in FIG. 4. Links 19 and 19a are attached to clamp members 18 and 18a with pins 16 and 16a. Links 19 and 19a have holes 32 and 32a positioned to receive draft pins 30 and 30a, which are fastened by nuts 31. The draft pins 30 and 30a are attached pivotally through bushings 23 and 23a of lift arms 22 and 22a of tractor 20 as shown in FIGS. 4 and 5. When lift arms 22 and 22a are hydraulically activated by the tractor hydraulic system the above flexible linkage will provide the means to raise or lower said flexibly attached linkage will provide the means to raise or lower tool bar 1 and any implement mounted thereon into and out of engagement with the soil.

The above description refers to the use of two point hydraulic lift systems incorporated in tractors with the invention. It can be seen that implements mounted on the tool bar, will not maintain a level attitude in relation to ground line, when raised or lowered. This would be a disadvantage to certain implements, as mounted plows, cultivators, planters, etc. when used over uneven ground terrain. To overcome this disadvantage the modified invention is shown in FIGS. 6 and 7. Wherein the modification also shown in detail FIG. 8 consists of mounting rear tool bar 1 in a pivotal manner with the extremities of said tool bar 1 having shaft projection 89 journaled through bearing block 90 which is attached to frame members 2 and 3 with caps 10 with bolts and nuts, The projection 89 is secured by collar 92 and nut 91. Refering to FIGS. 6 and 7 it can be seen that the anchor member 82 clamped to said pivotally journaled tool bar 1 and by attaching pin 85 to link 81 which in turn is pinned to tractor housing as shown in FIG. 7 will function as a stabilizer to implements attached to tool bar 1 and maintain thereby a substantially level attitude to said implement.

Figure 10:
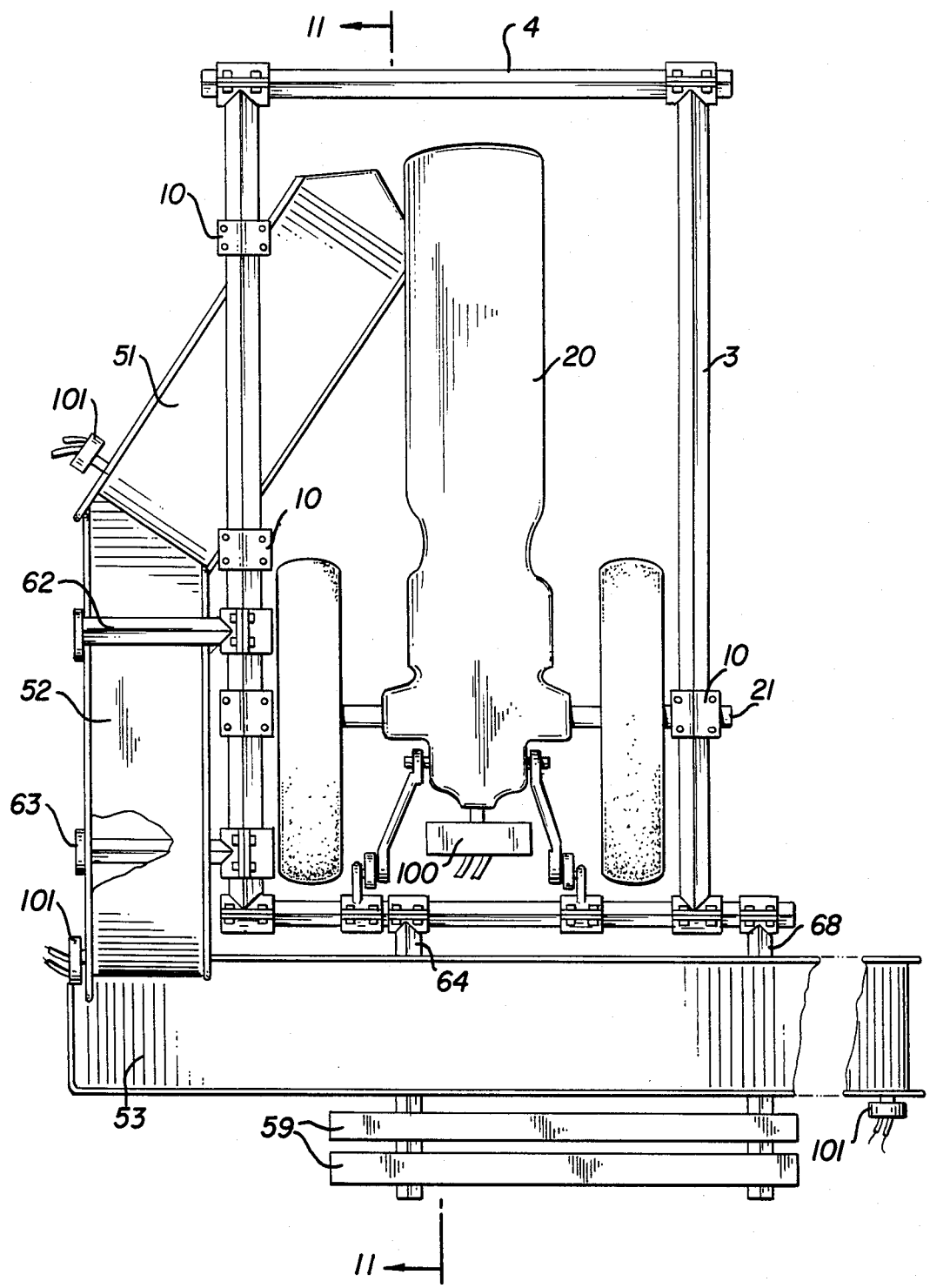
FIG. 10 is a upper plan view of an attached farm implement commonly known as a potato harvester shown in relation to the invention.
Figure 11:
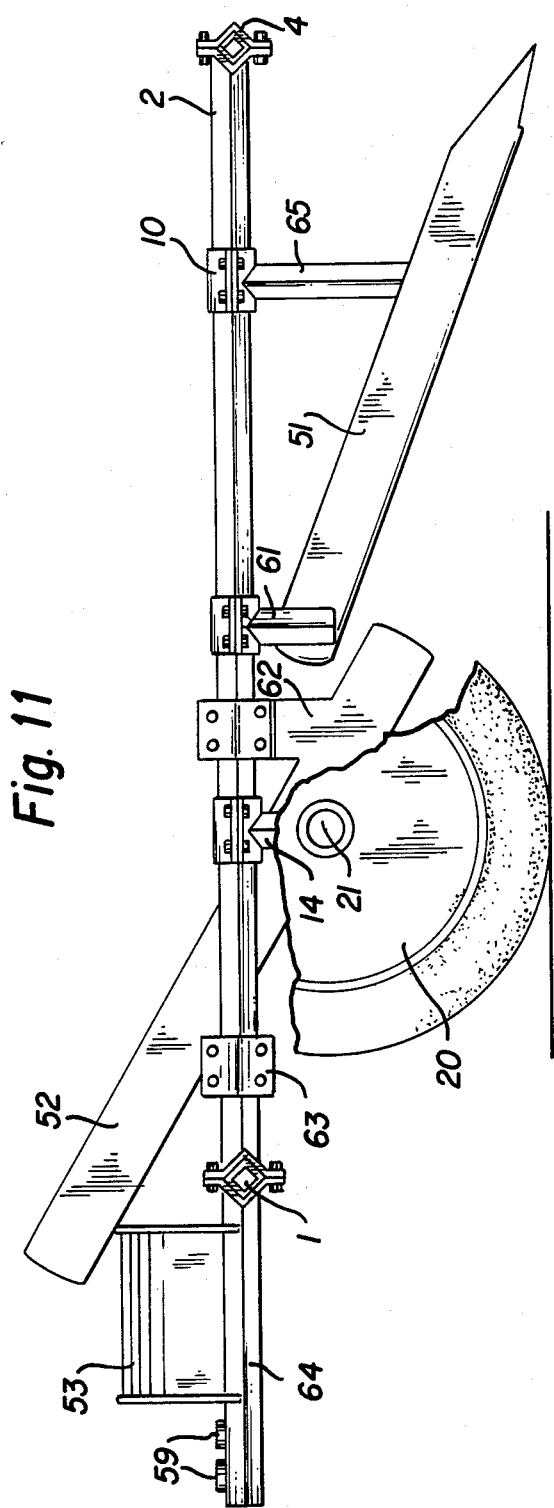
FIG. 11 is a sectional elevational view of FIG. 10 taken on line 11—11 thereof.

To further illustrate the uses and purposes of the invention, I now refer to FIG. 10 and FIG. 11. The elements 51, 52, and 53, with their incorporated mounting members 65, 61, 62, 64, and 68, form a combination of elements used as a potatoe harvester when attached to invention and powered by hydraulic motors 101 shown with broken hydraulic hoses and a attached to tractor 20 hydraulic pump 100 shown with broken hoses. The digging element 51 supported by mounting members 61 and 65, and powered by hydraulic motor 101 and hydraulic pump 100, are attached to invention with caps 10 and secured by bolts and nuts. Element 52 commonly known as a picker conveyor element is supported by mounting elements 62 and 63, and secured to invention by caps 10 and bolts and nuts, and is powered by a hydraulic motor 101, and pump 100. Element 53 commonaly known as a worktable and delivery conveyor is supported by mounting members 64, and 68, and is secured to invention by caps 10 and bolts and nuts, and also is powered by a hydraulic motor 100. A thusly constituted potato harvester implement with ground engaging blades in the front extremities of element 51 will lower into or raise above the soil with the tilting action of the invention as shown in FIG. 5, as was explained heretofore.

OPERATION

The invention is easily attached to tractor in the described embodiment by bolting elements 1, 2, 3, and 4 together and journaling the riser bearing members 15, and 15a, on the axle shaft 21. A squared rigid tool bar frame structure is the result. When the rear tool bar member is flexible linked to the hydraulically activated lift element of the tractor, the entire tool bar structure becomes a tilting platform to which implements may be attached on all sides of said structure. With attached tool bar adapted implements attached, the tractor is driven over soil and the implement performs its normal operation with more stability and accuracy with less strain on tractor and the hydraulic system thereof.

From the foregoing specification it is thought to be obvious that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention is related will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

What is claimed:

1. In combination with a tractor including a tractor body equipped with a hydraulic lift system, a rear axleshaft extending from either side of the rearward portion of said tractor body, said rear axleshaft being provided with rear wheels on the outer ends of said axleshaft, said rear axleshaft having rear axleshaft extensions projecting outwardly from the rear wheels thereon, a tool bar structure comprising:
    a. a pair of transversely positioned frame members connected to a pair of longitudinally positioned frame members to form a rigid rectangularly configured frame structure;
    b. pivotal mounting means attached to said longitudinally positioned frame members and pivotally mounted on said axleshaft extensions to allow the entire rectangularly configured frame structure to pivot and be carried on said rear axleshaft extensions outside the rear wheels;
    c. depth adjusting means positioned between said body of said tractor and said rigid rectangularly configured frame structure to provide the proper attitude thereof, said rectangularly configured frame structure being carried and solely supported by said axle extensions and said depth adjusting means, said depth adjusting means being connected to said frame structure only rearwardly of said pivotal mounting means, said depth adjusting means comprising said hydraulic lift system attached to the more rearwardly located one of said transversely positioned frame members by attachment means; and
    d. at least one of said frame members being configured so as to provide tool bar means to which implements may be attached or detached easily.
2. The tool bar structure of claim 1, wherein:
    a. said pivotal mounting means comprises a pair of anti-friction bearings which are journaled on said extensions of said rear axleshaft outside the rear wheels thereon.
3. The tool bar structure of claim 1, wherein:
    a. the depth adjusting means comprises a flexible linkage forming the attachment means of said lift arms to said more rearwardly located frame member.
4. The tool bar structure of claim 1, wherein:
    a. the configuration of said at least one of said frame members so as to provide tool bar means comprises said at least one of said frame members being a four sided tube with the sides thereof at a 45 degree angle from the perpendicular with respect to the plane defined by the frame members of said frame structure, thereby allowing easy attachment or detachment of implements therefrom.

* * * * *